(12) United States Patent
R (10) Patent No.: US 11,385,994 B2
(45) Date of Patent: Jul. 12, 2022

(54) TESTING AUTOMATION CONTROLLER FRAMEWORK AND A METHOD TO OPERATE THE SAME

(71) Applicant: Marlabs Innovations Private Limited, Bangalore (IN)

(72) Inventor: Govardhana Reddy R, Bellary (IN)

(73) Assignee: MARLABS INCORPORATED

( * ) Notice: Subject to any disclaimer, the term of this patent is extended or adjusted under 35 U.S.C. 154(b) by 1 day.

(21) Appl. No.: 16/531,203

(22) Filed: Aug. 5, 2019

(65) Prior Publication Data
US 2020/0073789 A1 Mar. 5, 2020

(30) Foreign Application Priority Data
Aug. 21, 2018 (IN) .............................. 201841031267

(51) Int. Cl.
G06F 11/00 (2006.01)
G06F 11/36 (2006.01)

(52) U.S. Cl.
CPC ................................. *G06F 11/3688* (2013.01)

(58) Field of Classification Search
CPC ............... G06F 11/28; G06F 11/36664; G06F 11/3684; G06F 11/3672; G06F 11/3688; G06F 11/3604
See application file for complete search history.

(56) References Cited

U.S. PATENT DOCUMENTS

| | | | |
|---|---|---|---|
| 5,673,387 A * | 9/1997 | Chen | G06F 11/3676 714/38.1 |
| 5,831,998 A * | 11/1998 | Ozmizrak | G01R 31/31835 714/741 |
| 5,892,947 A * | 4/1999 | De | G01R 31/2834 703/22 |
| 5,960,457 A * | 9/1999 | Skrovan | G06F 12/0831 711/141 |
| 6,011,830 A * | 1/2000 | Sasin | H04M 3/323 379/10.03 |

(Continued)

FOREIGN PATENT DOCUMENTS

IN 0729/DEL/2013 3/2013

OTHER PUBLICATIONS

Google Scholar/Patents—text refined (Year: 2021).*
Google Scholar/Patents search—text refined (Year: 2022).*

*Primary Examiner* — Christopher S McCarthy
(74) *Attorney, Agent, or Firm* — Jason C. Cameron (57) ABSTRACT

A testing automation controller framework and a method to operate the same are provided. The testing automation controller framework includes a processing subsystem which includes an acquisition module configured to receive one or more requests for testing of the at least one test case based from one or more users. The at least one test case includes a test case written in at least one of a plurality of technology platforms. The testing automation controller framework also includes a queue generation module configured to generate a queue of the corresponding one or more requests, a testing module configured to retrieve the one or more requests from the queue generation module, to test and execute the at least one test case sequentially based on a generated queue and to create a batch file for a test result obtained upon execution of the corresponding at least one test case.

8 Claims, 5 Drawing Sheets

(56) References Cited

U.S. PATENT DOCUMENTS

| | | | | |
|---|---|---|---|---|
| 6,031,990 A * | 2/2000 | Sivakumar | G06F 11/3664 | 714/E11.208 |
| 6,088,690 A * | 7/2000 | Gounares | G06N 3/126 | 706/13 |
| 6,148,427 A * | 11/2000 | Sherwood | G01R 31/318307 | 714/738 |
| 6,182,245 B1 * | 1/2001 | Akin | G06F 11/3672 | 711/100 |
| 6,219,829 B1 * | 4/2001 | Sivakumar | G06F 11/3664 | 714/E11.208 |
| 6,715,108 B1 * | 3/2004 | Badger | G06F 11/263 | 707/999.202 |
| 7,590,973 B1 * | 9/2009 | Barry | G06F 11/3688 | 714/38.14 |
| 7,694,181 B2 | 4/2010 | Noller et al. | | |
| 9,087,155 B2 * | 7/2015 | Boden | G06F 11/3692 | |
| 9,274,936 B2 * | 3/2016 | Soshin | G06F 11/3692 | |
| 2001/0052089 A1 * | 12/2001 | Gustavsson | G06F 11/3692 | 714/38.1 |
| 2003/0018932 A1 * | 1/2003 | Blum | G06F 11/273 | 714/46 |
| 2003/0196191 A1 * | 10/2003 | Hartman | G06F 11/3684 | 717/126 |
| 2004/0025088 A1 * | 2/2004 | Avvari | G06F 11/3676 | 714/38.13 |
| 2004/0088677 A1 * | 5/2004 | Williams | G06F 11/3684 | 717/104 |
| 2004/0181713 A1 * | 9/2004 | Lambert | G06F 11/3684 | 714/48 |
| 2005/0195390 A1 * | 9/2005 | Jeon | G06F 11/3688 | 356/237.2 |
| 2006/0122913 A1 * | 6/2006 | Chen | G06F 11/3414 | 705/26.8 |
| 2007/0010975 A1 * | 1/2007 | Fine | G06F 30/3323 | 703/2 |
| 2008/0126880 A1 * | 5/2008 | Hegarty | G06F 11/3684 | 714/46 |
| 2010/0070230 A1 | 3/2010 | Kumar et al. | | |
| 2011/0258600 A1 * | 10/2011 | Osenkov | G06F 11/3684 | 717/124 |
| 2011/0289489 A1 | 11/2011 | Kumar et al. | | |
| 2014/0359581 A1 * | 12/2014 | Soshin | G06F 11/3688 | 717/126 |
| 2015/0370691 A1 * | 12/2015 | Pandey | G06F 11/3672 | 714/38.1 |
| 2019/0149425 A1 * | 5/2019 | Larish | G06N 3/0454 | 706/16 |

* cited by examiner

TESTING AUTOMATION CONTROLLER FRAMEWORK AND A METHOD TO OPERATE THE SAME

CROSS-REFERENCE TO RELATED APPLICATION

This application claims the benefit of complete patent application having Patent Application No. 201841031267 filed on Aug. 21, 2018 in India.

FIELD OF INVENTION

Embodiments of the present disclosure relate to testing a test case, and more particularly to a testing automation controller framework and a method to operate the same.

BACKGROUND

With linear growth in the technology, test cases are being developed each day for various applications. Further, prior to implementing these test cases into the various applications domain, testing and executing these developed test cases is a primary criterion. Conventional systems which are used to test and execute such test cases includes a platform to retrieve the test case to be verified and tested. Upon receiving the test case, the conventional system verifies and executes the received test case. Further, on verifying the test case, a user needs to enable the conventional system to generate a result for the executed test case. Also, the conventional systems are unable to verify the test cases written in different technology platforms. Hence, each technology domain must have a supporting conventional system for analysis and verification of the test cases of different technology platforms.

In comparison with the conventional systems, newer system automatically tests, executes and generates results for the test cases chosen to be tested. Hence the newer system avoids the user intervention for enabling the newer system for generating the results of the test case upon execution. However, the newer system can test and execute the test case written in a specific technology platform. Such limitations restrict the testing and execution of the test cases written in different technology platforms, which give raise to using different testing system for corresponding test cases written in different technology platforms.

Hence, there is a need for an improved a testing automation controller framework and a method to operate the same to address the aforementioned issues.

BRIEF DESCRIPTION

In accordance with one embodiment of the disclosure, a testing automation controller framework is provided. The testing automation controller framework includes a processing subsystem. The processing subsystem includes an acquisition module. The acquisition module is configured to receive one or more requests for testing of the at least one test case based on one or more parameters from one or more users. The at least one test case includes a test case written in at least one of a plurality of technology platforms. The testing automation controller framework also includes a queue generation module operatively coupled to the acquisition module. The queue generation module is configured to generate a queue of the corresponding one or more requests for the testing of the at least one test case. The processing subsystem also includes a testing module operatively coupled to the queue generation module. The testing automation controller framework is configured to retrieve the one or more requests associated with the testing of the at least one test case from the queue generation module. The testing automation controller framework is also configured to test and execute the at least one test case sequentially based on a generated queue. The testing automation controller framework is also configured to create a batch file for a test result obtained upon execution of the corresponding at least one test case. The testing automation controller framework also includes a memory operatively coupled to the processing subsystem. The memory is configured to store the test result and the batch file.

In accordance with another embodiment of the present disclosure a method for testing at least one test case is provided. The method includes receiving one or more requests for testing of the at least one test case based on one or more parameters from one or more users. The at least one test case includes a test case written in at least one of a plurality of technology platforms. The method also includes generating a queue of the corresponding one or more requests for the testing of the at least one test case. The method also includes retrieving the one or more requests associated with the testing of the at least one test case. The method also includes testing and executing the at least one test case sequentially based on a generated queue. The method also includes creating a batch file for a test result obtained upon execution of the corresponding at least one test case.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a testing automation controller framework and a method to operate the same. The testing automation controller framework includes a processing subsystem. The processing subsystem includes an acquisition module. The acquisition module is configured to receive one or more requests for testing of the at least one test case based on one or more parameters from one or more users. The at least one test case includes a test case written in at least one of a plurality of technology platforms. The testing automation controller framework also includes a queue generation module operatively coupled to the acquisition module. The queue generation module is configured to generate a queue of the corresponding one or more requests for the testing of the at least one test case. The processing subsystem also includes a testing module operatively coupled to the queue generation module. The testing automation controller framework is configured to retrieve the one or more requests associated with the testing of the at least one test case from the queue generation module. The testing automation controller framework is also configured to test and execute the at least one test case sequentially based on a generated queue. The testing automation controller framework is also configured to create a batch file for a test result obtained upon execution of the corresponding at least one test case. The testing automation controller framework also includes a memory operatively coupled to the processing subsystem. The memory is configured to store the test result and the batch file.

Figure 1:
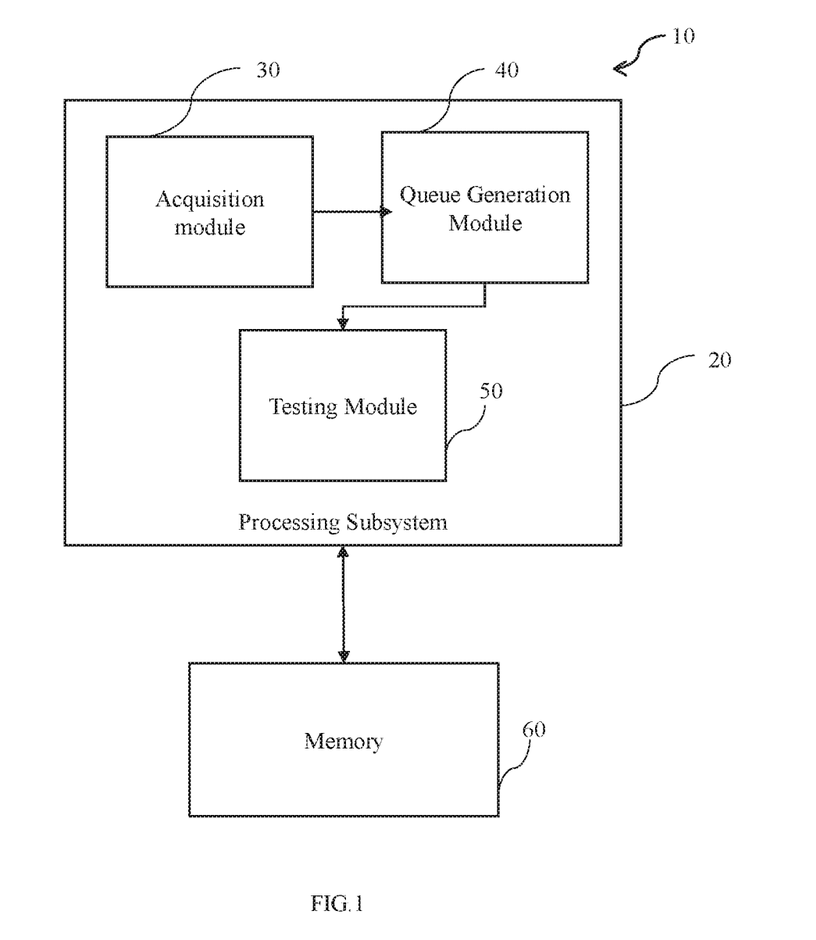
FIG. 1 is a block diagram of a testing automation controller framework for testing at least one test case in accordance with an embodiment of the present disclosure.

FIG. 1 is a block diagram of a testing automation controller framework 10 for testing at least one test case in accordance with an embodiment of the present disclosure. As used herein, the 'testing automation controller framework' 10 also known as testing automation framework is defined as an execution environment to test, verify and execute test cases which is written in any computer environment or a computer language. Also, the term 'test case' is defined as a type of specification of an input, an execution condition, a testing procedure and an expected result that defines a single test to be executed in order to achieve an objective associated to a particular software testing.

The testing automation controller framework 10 includes a processing subsystem 20. The processing subsystem 20 includes an acquisition module 30. The acquisition module 30 is configured to receive one or more requests for testing of the at least one test case based on one or more parameters from one or more users. In one embodiment, the one or more users may send a request to the acquisition module 30 requesting for testing of the at least one test case. In one exemplary embodiment, the one or more parameters may include at least one of a type of test, a part of the one or more test cases to be tested, a type of a technology domain and a type of a computer programming language.

Furthermore, the one or more users may upload the at least one test case to the acquisition module 30 through a user device. In such embodiment, the user device may be a computer device. Further, the at least one test case includes a test case written in at least one of a plurality of technology platforms. In one embodiment, the plurality of technology platforms may correspond to a plurality of testing automation controller frameworks. In another embodiment, the plurality of testing platforms may correspond to a plurality of computer environment. In one specific embodiment, the plurality of testing automation controller frameworks may correspond to a plurality of computer programming languages.

The testing automation controller framework 10 also includes a queue generation module 40 operatively coupled to the acquisition module 30. The queue generation module 40 is configured to generate a queue of the corresponding one or more requests for the testing of the at least one test case. In one embodiment, the testing automation controller framework 10 may generate a queue for the at least one test case based on at least one of a priority level, a type of technology platform and the like. In such embodiment, the queue generation module 40 may generate the queue in a form of one or more messages. In one specific embodiment, the queue generated by the queue generation module 40 may correspond to a private transitional messaging queue. As used herein, the term 'messaging queue' is defined as components which are used for inter-process communication or inter-thread communication within a said process.

In one specific embodiment, the one or more messages which may associate with the queue generated may include at least one of a test case identification of a selected at least one test case, a log in of the corresponding one or more users, a time of submission of the at least one test case by the corresponding one or more users and one or more browsers on which the at least one test case may be tested.

Furthermore, the testing automation controller framework 10 includes a testing module 50 operatively coupled to the queue generation module 40. The testing module 50 is configured to retrieve the one or more requests associated with the testing of the at least one test case from the queue generation module 40. In one embodiment, the testing module 50 retrieves the at least one test case based on the one or more messages which may be generated by the queue generation module 40.

The testing module 50 is also configured to test and execute the at least one test case sequentially based on a generated queue. More specifically, the testing module 50 tests and executes the at least one test case one after the other based on the queue generated. In one embodiment, a mapper file may be used to identify a location of the at least one test case to be executed based on the queue generated.

In one exemplary embodiment, the testing module 50 may first test the at least one test case for one or more errors. Consequently, the testing module 50 executes the at least one test case if the at least one test case is free from the one or more errors. In another embodiment, the testing module 50 may generate an error notification upon detecting the one or more errors in the at least one test case. Consequently, the one or more users may rectify the detected one or more errors and may further enable the testing module 50 to execute the at least one test case upon rectifying the one or more errors.

The testing module 50 is also configured to create a batch file for a test result obtained upon execution of the corresponding at least one test case. As used herein, the term 'batch file' is defined as a file which is stored in a computer system which includes a list of instructions or rules which is used to execute the at least one test case. In one embodiment, the batch file may be used to test the at least one test case in future. In such embodiment, the batch file may be used as a reference file for testing the at least one file of the same category. In one specific embodiment, the hatch file may be stored in a queue support file location associated with the queue generated for the corresponding at least one test case.

In one exemplary embodiment, the testing automation controller framework 10 may include a tracking module not shown in FIG. 1 operatively coupled to the testing module 50. The tracking module is configured to track every stage of execution of the at least one test case when being tested and executed. In such embodiment, the tracking module may generate a notification if any of the stage of execution is found to generate the one or more errors.

The testing automation controller framework 10 also includes a memory 60 operatively coupled to the processing subsystem 20. The memory 60 is configured to store the test result and the batch file. In one embodiment, the memory 60 may be a random-access memory (RAM), a read only memory (ROM), an external memory and the like. In one exemplary embodiment, the memory 60 may be stored on a remote storage such as a cloud storage.

Furthermore, in one exemplary embodiment, the testing automation controller framework 10 may further include a report module (1 not shown in FIG. 1) operatively coupled to the testing module 50. The report module is configured to generate one or more reports for the test results obtained upon execution of the at least one test case. In such embodiment, the report module may generate at least one of a dashboard, a structured threat information expression and an application programming interface to represent the test results obtained upon execution of the at least one test case. In one specific embodiment, the report module may update a status of the execution of the at least one test case in the one or more reports and may share the same with the corresponding one or more users through an electronic mail (e-mail).

Figure 2:
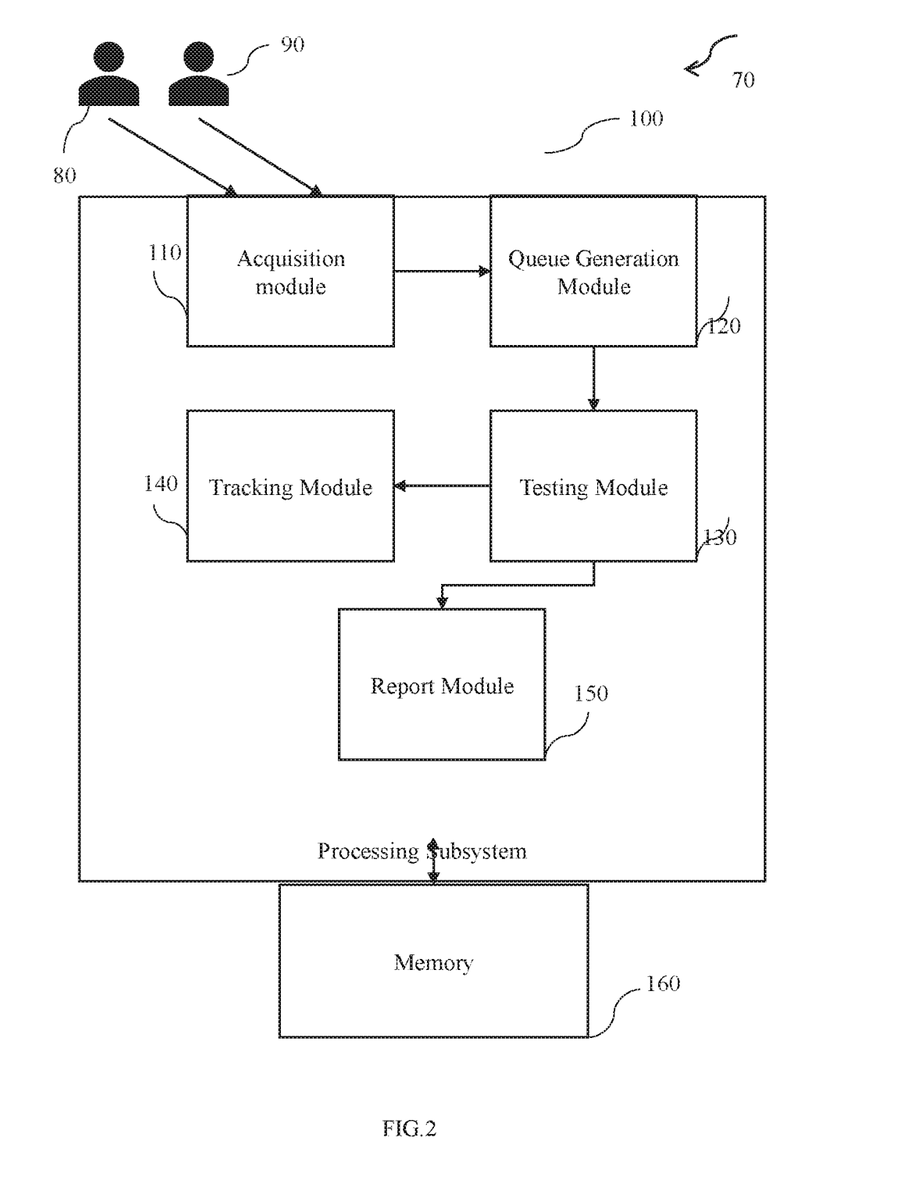
FIG. 2 is a schematic representation of an exemplary testing automation controller framework for testing a plurality of frameworks in accordance with an embodiment of the present disclosure.

FIG. 2 is a schematic representation of an exemplary testing automation controller framework 70 for testing a plurality of frameworks in accordance with an embodiment of the present disclosure. A user X 80 and a user Y 90 needs to test and execute a test case B and a test case C respectively. The test case B is written in language M and the test case C is written in language N. The user X 80 and the user Y 90 sends a request to an acquisition module 110 of a processing subsystem 100 for testing the test case B and the test case C respectively. Also, the user X 80 send the request for testing the test case B to the acquisition module 110 prior to the user Y 90, leading to a time delay between the request sent by the user X 80 and the user Y 90.

Also, the testing automation controller framework 70 enables the user X 80 and the user Y 90 to input a plurality of parameters such as a type of test, a part of the test case B and the test case C to be tested, a type of a technology domain, that is the languages in which the test case B and the test case C to be tested, a technology domain the test case B and the test C belongs to respectively and a browser on which the user X 80 and the user Y 90 wishes to test and execute the test case B and the test case C respectively.

Furthermore, based on the time delay and the plurality of parameters associated with the test case B and the test case C, a queue generation module 120 which is operatively coupled to the acquisition module 110 generates a queue for the request of testing requested by the user X 80 and the user Y 90 in a form of a message. Furthermore, a testing module 130 which is operatively coupled to the queue generation module 120 retrieves the message associated with the request of the user X 80 and the user Y 90 from the queue generation module 120.

Figure 3:
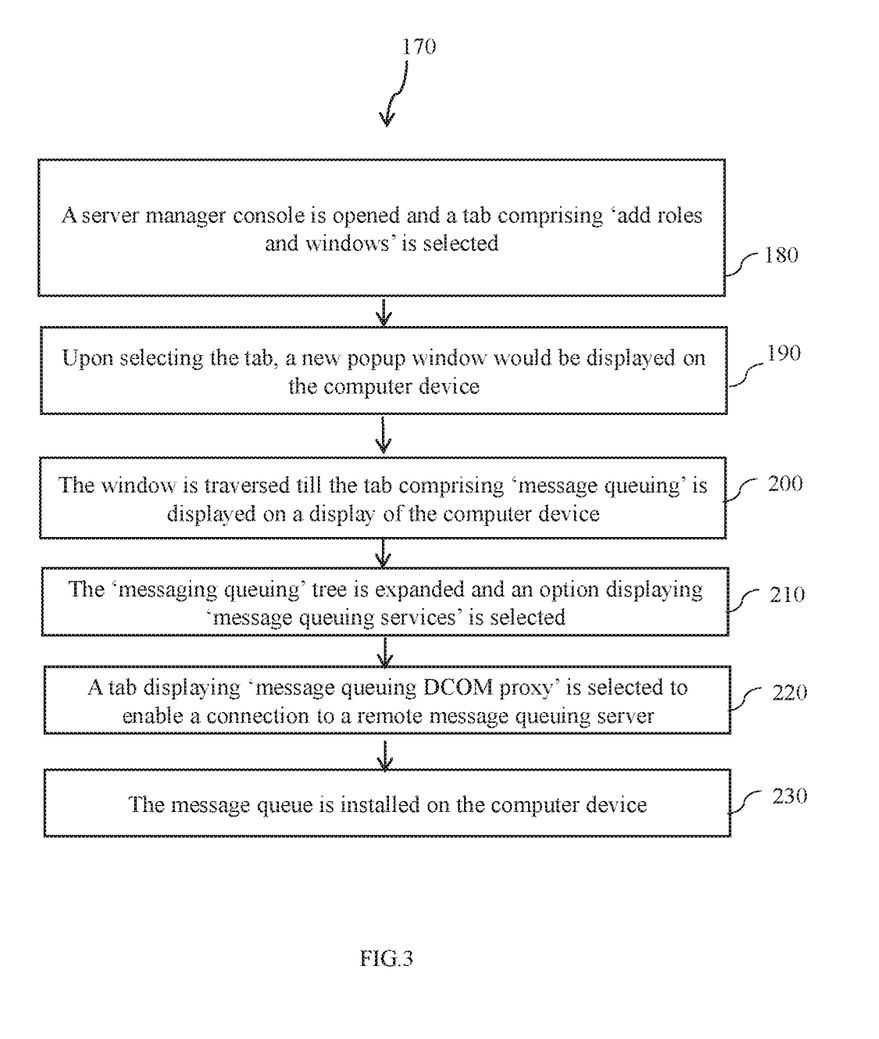
FIG. 3 is a flow chart representing the steps involved in an exemplary method for installing a message queue for testing at least one test case in accordance with an embodiment of the present disclosure.

For example, a message queue which is substantially similar to the queue generation module 120 may be installed on a computer device associated with the user X 80 and the user Y 90 respectively. The message queue is configured to generate and maintained the queue associated with the request raised by the user X 80 and the user Y 90. A method 170 to install the message queue is adapted through the steps as shown in FIG. 3. A server manager console is opened and a tab comprising 'add roles and windows' is selected in step 180. Upon selecting the tab, a new popup window would be displayed on the computer device in step 190. Further, the window is traversed till the tab comprising 'message queuing' is displayed on a display of the computer device in step 200. Consequently, the 'messaging queuing' tree is expanded and an option displaying 'message queuing services' is selected in step 210.

Furthermore, a tab displaying 'message queuing ICOM proxy' is selected to enable a connection to a remote message queuing server in step 220. Consequently, the message queue is installed on the computer device in step 230. upon installing the message queue, a new message queue is created in order to test the test file B and the test file C by the user X 80 and the user Y 90 respectively.

Figure 4:
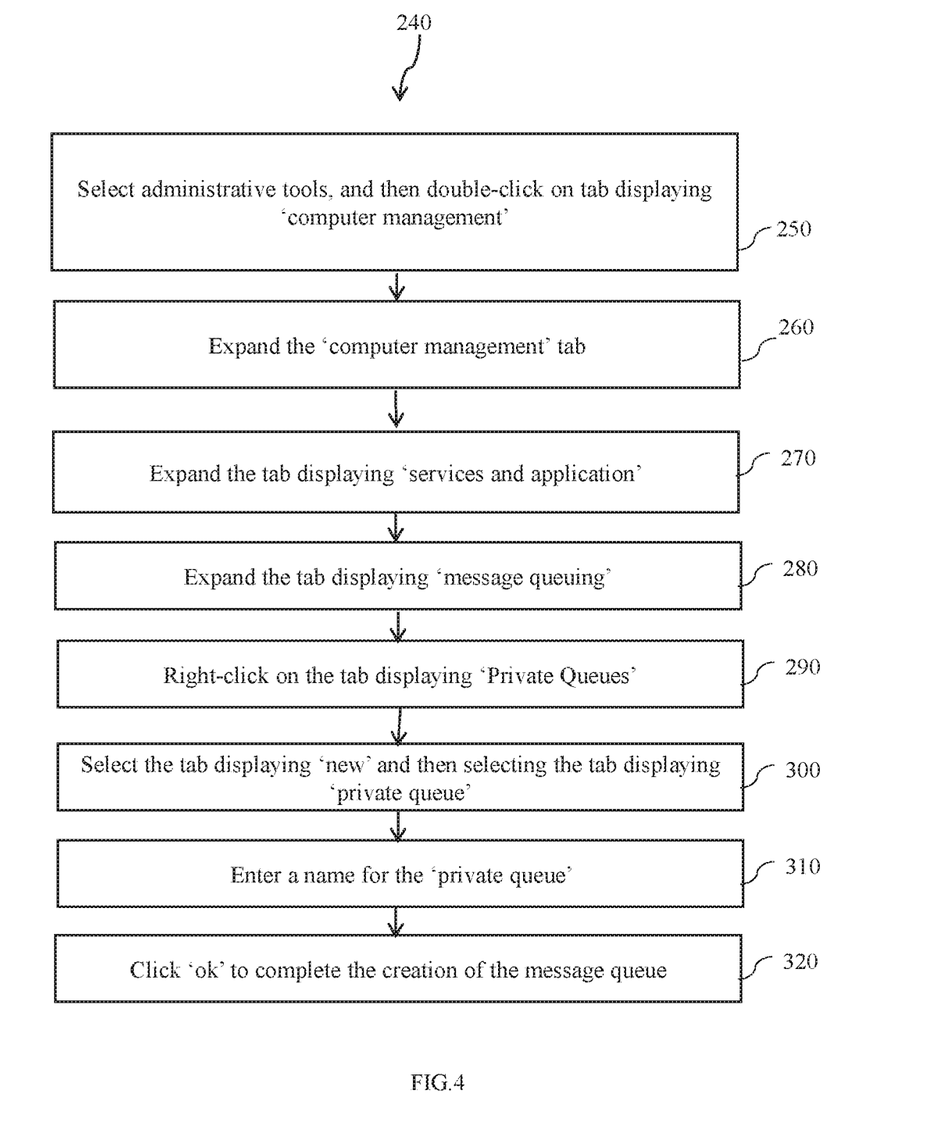
FIG. 4 is a flow chart representing the steps involved in another exemplary method for creating a message queue for testing at least one test case in accordance with an embodiment of the present disclosure.

Upon completing the installation of the message queue, a new message queue is created. A method 240 for creating the message queue is as shown in FIG. 4. The method 240 includes selecting administrative tools, and then double-click on tab displaying 'computer management' in step 250. Expanding the 'computer management' tab in step 260, further expanding the tab displaying 'services and application' in step 270 and then expanding the tab displaying 'message queuing' in step 280. Consequently, Right-clicking on the tab displaying 'Private Queues' in step 290, selecting the tab displaying 'new' and then selecting the tab displaying 'private queue' in step 300. Furthermore, entering a name for the 'private queue' in step 310 and then clicking 'ok' to complete the creation of the message queue in step 320. Furthermore, upon the creation of the message queue, the queue which is generated by the queue generation module is displayed under the tab 'private queues'.

Furthermore, the test case B and the test case C is verified using an automation framework, for verifying, testing and executing the test case B and the test case C respectively. Upon retrieving the test case B and the test case C, verification for the same will be conducted by the automation framework. If the test case B and the test case C passes through the current configuration, message will be queued for the further execution of the test case B and the test case C.

The message is retrieved from the queue generation module 120. Upon retrieving the message, the testing module 130 tests the test case B first and then tests the test case C as the queue generation module 120 would have generated the queue for testing of the test cases one sequentially. Furthermore, if a test result of the test case B and the test case C generates a positive result, the testing module 130 further executes the test case B and the test case C sequentially.

Furthermore, upon executing the test case B and the test case C, the testing module 130 creates a first batch file for the test case B written in language M and a second batch file for the test case C written in language N. Simultaneously, a tracking module 140 which is operatively coupled to the testing module 130 tracks the testing and the execution of the test case B and the test case C respectively.

Upon executing the test case B and the test case C, a report module 150 which is operatively coupled to the testing module 130 generates a first report and a second report based for the test case B and the test case C respectively.

A test result of the test case B and a test result of the test case C along with the first batch file and the second batch file is stored in a memory 160 which is operatively coupled to the processing subsystem 100. The first batch file and the second batch file are also stored within the memory 160.

Furthermore, the processing subsystem 100, the acquisition module 110, the queue generation module 120, the testing module 130 and the memory 150 is substantially similar to a processing subsystem 20, an acquisition module 30, a queue generation module 40, a testing module 50 and a memory 60 of FIG. 1.

Figure 5:
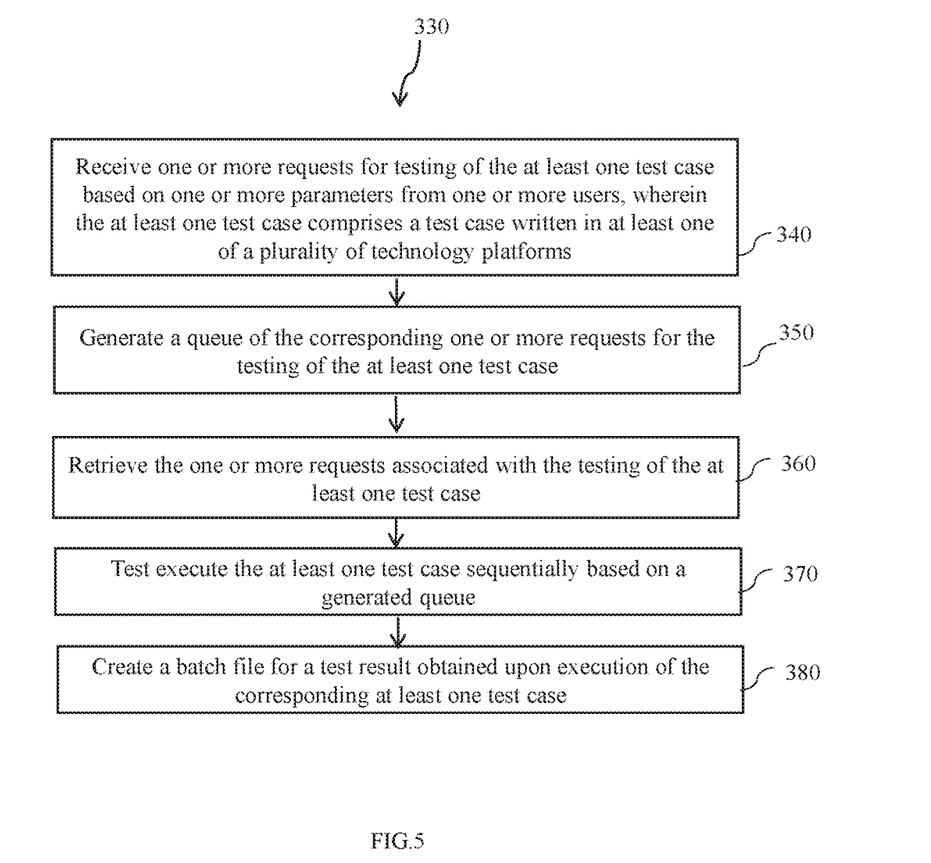
FIG. 5 is a flow chart representing the steps involved in a method for testing at least one test case in accordance with an embodiment of the present disclosure.

FIG. 5 is a flow chart representing the steps involved in a method 330 for testing at least one test case in accordance with an embodiment of the present disclosure. The method 330 includes receiving one or more requests for testing of the at least one test case based on one or more parameters from one or more users. The at least one test case comprises a test case written in at least one of a plurality of technology platforms in step 340. In one embodiment, receiving the one or more requests for testing of the at least one test case may include receiving the one or more requests for testing of the at least one test case based on at least one of a type of test, a part of the one or more test cases to be tested, a type of a technology domain and a type of a technology platform. In one exemplary embodiment, receiving the one or more requests for testing of the at least one test case may include receiving the one or more request from an acquisition module which may be communicatively coupled to The method 330 also includes generating a queue of the corresponding one or more requests for the testing of the at least one test case in step 350. In one embodiment, generating the queue of the corresponding one or more requests for testing of the at least one test case may include generating the queue of the corresponding one or more requests based on at least one of a priority level, a type of technology platform and the like. In another embodiment, generating the queue for the one or more requests for the testing of the at least one test case may include generating one or more messages associated with the one or more requests for testing of the at least one test case. In such embodiment, generating the queue of the one or more requests may include generating the queue of the one or more requests by a queue generation module which may be operatively couple to the acquisition module.

Furthermore, the method 330 includes retrieving the one or more requests associated with the testing of the at least one test case in step 360. In one embodiment, retrieving the one or more requests may include retrieving the one or more messages associated with the one or more requests for testing of the at least one test case. In one exemplary embodiment, retrieving the one or more requests associated with the testing of the at least one test case may include retrieving the one or more requests associated with the testing of the at least one test case by a testing module which may be operatively coupled to the queue generation module.

The method 330 also includes testing and executing the at least one test case sequentially based on a generated queue in step 370. In one embodiment, testing and executing the at least one test case may include retrieving the one or more requests sequentially based on the queue generated. Consequently, testing the at least one test code associated with the retrieved one or more requests. In such embodiment, the method 330 may include generating a notification upon detecting one or more errors which may be associated to the at least one test case. In such another embodiment, the method 330 may include compiling the at least one test case upon receiving a positive test result after testing. Subsequently, executing the at least one test case upon being tested. In one exemplary embodiment, testing and executing the at least one test case sequentially based on the generated queue may include testing and executing the at least one test case by the testing module.

The method 330 also includes creating a batch file for the at least one test result obtained upon execution of the corresponding at least one test case in step 380. In one embodiment, creating the batch file for the at least one test case may include creating the batch file by the testing module. In another embodiment, the method 330 may further include storing the batch file as a reference for the reference file for testing the at least one file of a same category.

In one exemplary embodiment, the method 330 may further include tracking every stage of execution of the at least one test case when being tested and executed. In such embodiment, tracking every stage of execution of the at least one test case may include tracking every stage of execution by the tracking module. In one embodiment, the method 330 may also include generating the notification if any of the stage of execution is found to generate the one or more errors.

In another exemplary embodiment, the method 330 may further include generating one or more reports for the test results obtained upon execution of the at least one test case. In such embodiment, generating the one or more reports may include generating the one or more reports by a report module which may be operatively coupled to the testing module. In one embodiment, generating the one or more reports may include generating at least one of a dashboard, a structured threat information expression and an application programming interface to represent the test results obtained upon execution of the at least one test case.

Various embodiments of the present disclosure enable the testing platform to execute the at least one test case which is written in any of the plurality of technology platforms. Henceforth, eradicating the conventional method of using different testing platforms for the at least one test case written in the corresponding technology platform thereby making the testing platform independent of the technology which is used to develop the at least one test case.

Also, the testing platform uses minimal execution time as the distribution and execution of the at least one test case happens parallelly. The testing platforms enables a connectivity for one or more open-source testing tools which increases the efficiency of testing the at least one test case.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A testing automation controller framework for testing at least one test case comprising:
a hardware processing subsystem; and
a non-transitory memory coupled to the hardware processing subsystem, wherein the memory comprises a plurality of modules in the form of programmable instructions executable by the processing subsystem, wherein the plurality of modules comprises:
an acquisition module configured to receive one or more requests for testing of the at least one test case based on one or more parameters from one or more users, wherein the at least one test case comprises a test case written in at least one of a plurality of technology platforms is selected from a plurality of technology platforms by the one or more users and wherein the one or more parameters comprises of a type of test, a part of the one or more test cases to be tested, a type of a technology domain, a type of a computer programming language, and a web browser to execute the test case;
a queue generation module operatively coupled to the acquisition module, and configured to generate a queue of the corresponding one or more requests for the testing of the at least one test case based on the one or more parameters and a time delay, wherein the queue is generated in form of one or more messages comprising at least one of a test case identification, login of one or more users, a time submission of the test case and one or more browsers for test case to be tested;
a testing module operatively coupled to the queue generation module, and configured to:
retrieve the one or more requests associated with the testing of the at least one test case from the queue generation module;
test and execute the at least one test case sequentially based on a generated queue;
create a batch file for a test result obtained upon execution of the corresponding at least one test case; and
the memory operatively coupled to the processing subsystem, and configured to store the test result and the batch file.

2. The testing automation controller framework as claimed in claim 1, wherein the plurality of technology platforms corresponds to a plurality of testing automation controller frameworks, wherein each of the plurality of framework is associated with a specific computer environment of a plurality of computer environments.

3. The testing automation controller framework as claimed in claim 1, wherein the plurality of modules further comprising a tracking module operatively coupled to the testing module and configured to track every stage of execution of the at least one test case when being tested and executed.

4. The testing automation controller framework as claimed in claim 1, wherein the plurality of modules further comprising a report module operatively coupled to the testing module and configured to generate one or more reports for the test results obtained upon execution of the at least one test case.

5. A method for testing at least one test case comprising:
receiving, by an acquisition module executable by a hardware processing subsystem, one or more requests for testing of the at least one test case based on one or more parameters from one or more users, wherein the at least one test case comprises a test case written in at least one of a plurality of technology platforms is selected from a plurality of technology platforms by the one or more users and wherein the one or more parameters comprises of a type of the test, a part of the one or more test cases to be tested, a type of a technology domain and a type of a computer programming language, web browser;
generating, by a queue generation module executable by the hardware processing subsystem, a queue of the corresponding one or more requests for the testing of the at least one test case based on the one or more parameters and a time delay, wherein the queue is generated in form of one or more messages comprising at least one of a test case identification, login of one or more users, a time submission of the test case and one or more browsers for test case to be tested;
retrieving, by a testing module executable by the hardware processing subsystem, the one or more requests associated with the testing of the at least one test case;
testing and executing, by the testing module executable by the hardware processing subsystem, the at least one test case sequentially based on a generated queue; and
creating, by the testing module executable by the hardware processing subsystem, a batch file for a test result obtained upon execution of the corresponding at least one test case.

6. The method as claimed in claim 5, further comprising storing, by the memory, the test result and the batch file.

7. The method as claimed in claim 5, further comprising tracking, by a tracking module, every stage of execution of the at least one test case when being tested and executed.

8. The method as claimed in claim 5, further comprising generating, by a report module, one or more reports for the test results obtained upon execution of the at least one test case.

* * * * *